Patented Mar. 28, 1950

2,501,907

UNITED STATES PATENT OFFICE 2,501,907

TRIAMINO BENZENE MONOHYDRATE

Andrew McLean, West Kilbride, William Edward Tetlow, Saltcoats, and John Munro, West Kilbride, Scotland, assignors to Imperial Chemical Industries Limited, a corporation of Great Britain No Drawing. Application January 29, 1946, Serial No. 644,190. In Great Britain March 28, 1945

2 Claims. (Cl. 260—580)

The present invention relates to an improved method for the formation of triamino-monocyclic aromatic hydrocarbons of the kind in which the three amino groups in the nucleus are in the meta-position with respect to one another, for instance 2:4:6 triamino-toluene and 1:3:5 triamino-benzene, by reduction of the corresponding trinitro compounds. The invention is particularly concerned with the isolation of the compounds from the reaction mixtures containing the reduced trinitro compounds obtained according to the present invention as the free triamino compounds themselves, or as their hydrates.

It is known that the free triamino-monocyclic aromatic hydrocarbons in which the three amino groups are in the meta-position with respect to one another are markedly unstable substances, and darken more or less rapidly in air, even in the crystalline state. The rapidity with which these compounds deteriorate depends to a certain extent on their purity; the more highly purified preparations being the least rapidly deteriorated on storage. In contrast to the free bases, their salts, for instance their trihydrochlorides and their acyl derivatives for instance their triacetyl derivatives are relatively stable.

The usual methods of reducing the nitro aromatic compounds in which there is used a metal and an acid in which it is ordinarily capable of dissolving with the evolution of hydrogen give salts of triamino-monocyclic aromatic hydrocarbons of the kind described when they are applied to the corresponding trinitro-hydrocarbons, from which salts it is difficult to obtain the free bases.

Hein and Wagner (Berichte der Deutschen Chemischen Gesellschaft, volume 68b, 1935, pages 856 to 864) have described a method for obtaining 2:4:6 triamino-toluene and certain other triamino-monocyclic aromatic hydrocarbons by reduction of trinitro-toluene or its homologues in solution in slightly aqueous alcohol with hydrogen in presence of a palladium catalyst precipitated on barium sulphate or other carriers. Other catalysts tried by these authors appear to have been less satisfactory. In order to get a good yield of 2:4:6 triamino-toluene by reduction of trinitro-toluol with the palladium catalyst these authors found it necessary to filter the reaction mixture with careful exclusion of air from the hydrogen atmosphere and completely to evaporate the solvent and dry the product by distillation under reduced pressure, still in contact with the hydrogen atmosphere, and storage over sulphuric acid in a vacuum desiccator, and then to recrystallise the product from solvent, after which treatment it was reasonably stable. These authors indicate that the complete desiccation of the product was essential before reasonable stability could be expected. The best yield claimed by them was 60 per cent of the theoretical. The process of Hein and Wagner is obviously a troublesome one, and the use of the relatively expensive and not easily available material palladium as a catalyst is a disadvantage.

We have now found that the catalytic reduction of the trinitromonocyclic aromatic hydrocarbons in which the nitro groups in the nucleus are in the meta-position to one another proceeds with greater rapidity and with the formation of a purer triamino product if the catalyst used is "Raney" nickel and that the isolation of the free triamino compound or a hydrate derivative is facilitated if the solvent used for the trinitroaromatic hydrocarbon is an ester solvent.

According to the present invention the method for the production of triamino-monocyclic aromatic hydrocarbons of the kind in which the three amino groups in the nucleus are in the meta-position with respect to one another by the reduction of the corresponding trinitrocompounds and the isolation of the triamino hydrocarbons as the free base or as a hydrate comprises carrying out the said reduction with hydrogen and "Raney" nickel in an ester solvent for the said trinitrocompound.

The "Raney" nickel is preferably obtained by treating a nickel-aluminium alloy with sodium hydroxide solution as for instance described in "Organic Syntheses" (volume 21, pages 15 to 17). As the ester solvent for the trinitro compound there may advantageously be used a saturated aliphatic ester solvent, for instance ethyl acetate, so that for instance a good yield of 2:4:6 triamino-toluene can be directly crystallised from the ethyl acetate after the catalyst has been filtered off.

The reaction may be carried out at ordinary, or preferably at somewhat increased pressure. The reaction may conveniently be started at room temperature and the reaction mixture allowed to warm itself up. Glass apparatus may be used for the purpose. The reaction vessel is advantageously subjected to shaking while the hydrogen is being passed through the solution in presence of the nickel catalyst. The passage of hydrogen is continued until the amount absorbed is the theoretical, after which the reaction mixture is filtered even in presence of air, and the free amine or hydrate derivative can be obtained in a state of excellent purity and good yield by cooling or concentrating the filtrate.

The concentration of the trinitro compound in the solvent used is advantageously not less than about 3 per cent and saturated solutions may conveniently be used.

The invention is further illustrated by the following examples:

EXAMPLE 1

*Preparation of 1:3:5 triaminobenzene monohydrate*

A mixture of 10 parts of 1:3:5 trinitrobenzene and 270 parts of ethyl acetate is shaken with 3 to 5 parts of "Raney" nickel catalyst in an atmosphere of hydrogen (initial pressure 40 lbs. per square inch) for 40 minutes. By this time the reduction is complete and the temperature of the reaction has risen from room temperature to about 50° C. The solution is filtered in air from the catalyst while it is still warm and the triaminobenzene monohydrate separates out on cooling in long white needles. The yield is 86 per cent of theory and the melting point is 84–85° C. This compound does not appear to have been previously described. It is stable when kept in the dark, but it slowly darkens on exposure to light.

EXAMPLE 2

*Preparation of 2:4:6 triaminotoluene*

10 parts of trinitrotoluene dissolved in 180 parts ethyl acetate are shaken with 3 parts "Raney" nickel alloy in an atmosphere of hydrogen at a pressure of 40 lb. per square inch. Theoretical uptake is obtained in 35 minutes. The amine solution is filtered through a fluted filter paper to free it from catalyst. On cooling in an ice/salt mixture the free amine is obtained as white crystals. Yield 61 per cent. Melting point 121° C.

EXAMPLE 3

*Preparation of 2:4:6 triaminotoluene*

10 parts of trinitrotoluene dissolved in 180 parts of a mixture of equal volumes of ethyl and butyl acetates, are shaken with 3 parts "Raney" nickel alloy in an atmosphere of hydrogen at normal pressure. Theoretical uptake is obtained in 175 minutes. The amine is isolated as in Example 2. Yield 55 per cent. Melting point 121° C.

EXAMPLE 4

*Preparation of 2:4:6 triaminotoluene*

5 parts of trinitrotoluene dissolved in 185 parts di-ethyl carbonate containing 5 per cent acetone to disperse the water formed during the reaction are shaken with hydrogen at 30 lb. per square inch with 3 parts of "Raney" nickel. Theoretical uptake is obtained in 35 minutes. The free base is isolated as in Example 2. Yield 42 per cent. Melting point 120° C.

EXAMPLE 5

*Preparation of 2:4:6 triaminoethyl benzene*

10 parts trinitroethyl benzene dissolved in 200 parts ethyl acetate are hydrogenated in presence of 3 parts of "Raney" nickel at 30 lb. per square inch. Theoretical uptake is obtained in 35 minutes. On cooling 2:4:6 triaminoethyl benzene is obtained in leaf-like crystals, melting point 73–74° C. Yield 60 per cent. On standing for a prolonged period over concentrated sulphuric acid the crystals appear to lose water. 2:4:6 triaminoethyl benzene ($C_8H_{13}N_3$) does not appear to have been mentioned in the literature before. The formula $C_8H_{13}N_3$ requires C=63.5 per cent, H=8.65 per cent, N=27.8 per cent. The analytical figures obtained were C=62.06 per cent, H=8.41 per cent, N=27.82 per cent.

We claim:

1. A process for the production of 1:3:5 triamino-benzene monohydrate which comprises contacting 1:3:5 trinitro benzene in an ethyl acetate solvent with hydrogen in the presence of a "Raney" nickel catalyst.

2. As a new compound, 1:3:5 triamino benzene monohydrate.

ANDREW McLEAN.
WILLIAM E. TETLOW.
JOHN MUNRO.

REFERENCES CITED

The following references are of record in the file of this patent:

UNITED STATES PATENTS

| Number | Name | Date |
|---|---|---|
| 1,492,094 | Bielouss | Apr. 29, 1924 |
| 2,292,879 | Kise | Aug. 11, 1942 |

FOREIGN PATENTS

| Number | Country | Date |
|---|---|---|
| 166,934 | Great Britain | July 25, 1921 |

OTHER REFERENCES

Bidet, "Compt. rend.," vol. 158, pages 876–878 (1914).

Herzig et al., "Monatsh," vol. 37, pages 577–585 (1916).

Beilstein, "Hanbuch der Org. Chemie," vol. XIII, page 299 (4th ed., published by V. Julius Springer, Berlin, 1930).

Hein et al., "Berichte," 68B, 856–864 (1935).

Lewis et al., "Transactions American Electrochemical Society," 84, 135 (1943).

Degering, "Organic Nitrogen Cpds." (Univ. Litho., Ypsilanti, Mich., 1945), page 304, para. 946.